(No Model.)
W. P. RYMAN.
ELECTRIC LOW WATER ALARM FOR BOILERS.
No. 323,600.  Patented Aug. 4, 1885.
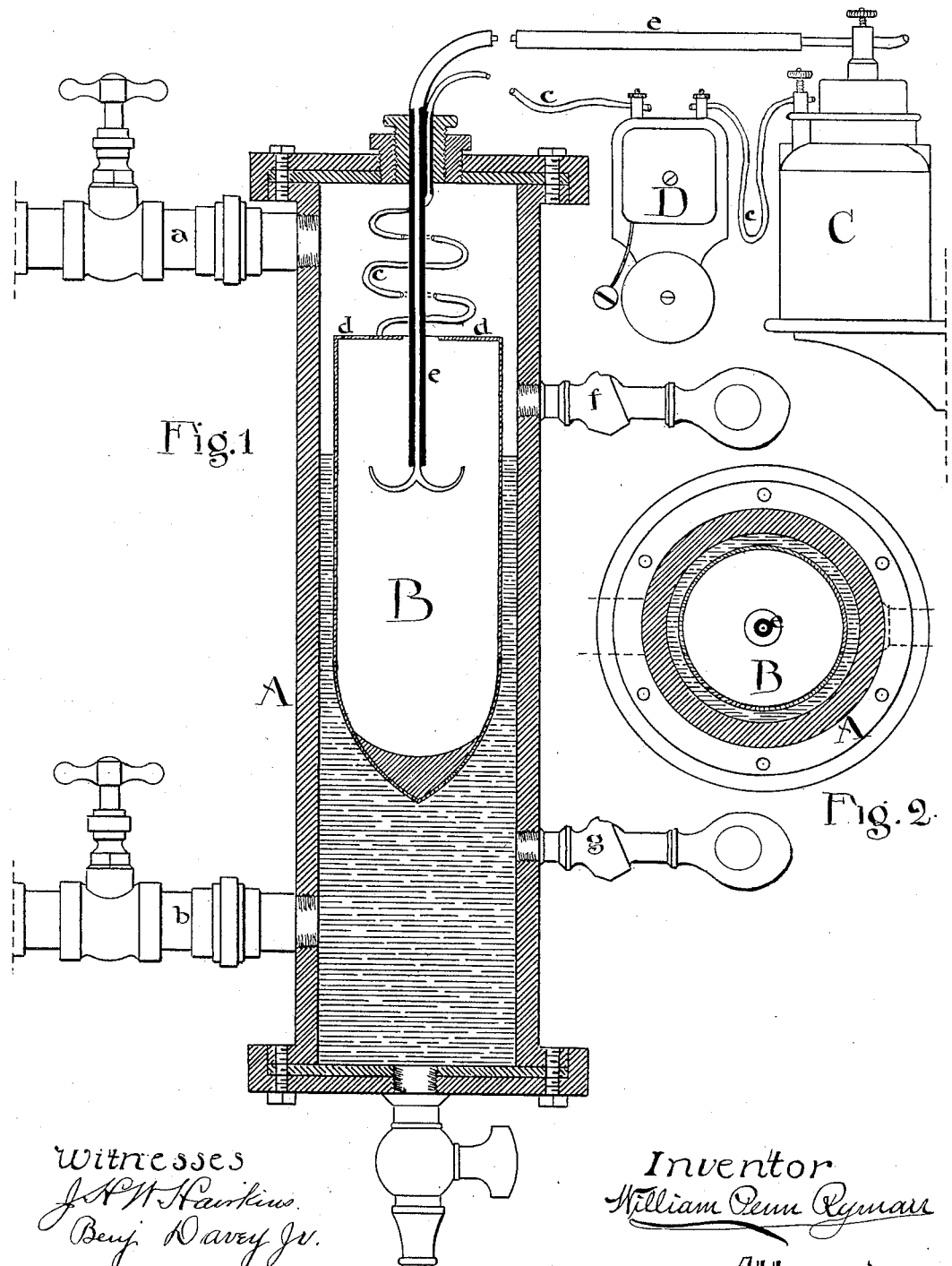
Witnesses
J. H. W. Hawkins.
Benj. Davey Jr.
Inventor
William Penn Ryman
Attorney

UNITED STATES PATENT OFFICE.

WILLIAM PENN RYMAN, OF WILKES-BARRÉ, PENNSYLVANIA.

ELECTRIC LOW-WATER ALARM FOR BOILERS.

SPECIFICATION forming part of Letters Patent No. 323,600, dated August 4, 1885.

Application filed February 6, 1885. (No model.)

*To all whom it may concern:*

Be it known that I, WILLIAM PENN RYMAN, a citizen of the United States, residing at Wilkes-Barré, county of Luzerne, and State of Pennsylvania, have invented certain Improvements in Electric Low-Water Alarms for Steam-Boilers, of which the following is a specification.

My invention relates to an improvement in electric low-water alarms, in which a float in a vessel or upright tube communicating with the boiler is so adapted and adjusted to an electric battery and electric alarm-bell as to operate and ring the alarm-bell by closing the circuit of the electric battery with the falling of the water and float.

The object of my invention is to provide for the sounding of one or more electric alarm-bells at any desired place or places upon the undue lowering of the water in the boiler. I attain this object by the mechanism illustrated in the accompanying drawings, in which—

Figure 1 is a side view, partly in section, of the entire apparatus with battery and one electric alarm-bell connected. Fig. 2 is a sectional view from the top of the vessel, showing the float and other parts of the apparatus as they would appear on looking down with the top of vessel removed.

Similar letters refer to similar parts in both the views.

A is the vessel or upright tube, of suitable shape, style, and size, communicating at or near the upper end with the steam-space of the boiler through the pipe $a$, which is provided with a shut-off valve, and at or near the lower end with the water-space in the boiler through the pipe $b$, which is also provided with a shut-off valve. The vessel or upright tube A, thus communicating, is so placed and adjusted as to always maintain the same water-level in it as in the boiler.

Within the vessel or upright tube A is a float, B, made of any suitable and substantial materials of good electrical conductivity, and provided with an opening in the center of the top, so as to admit of its sliding easily and loosely up and down on the rod or wire $e$. To the float B, and connecting with the plate $d$ at the top, is attached a flexible wire, $c$, of suitable conductivity and properly insulated, leading to and connecting with one pole or electrode of C, an electric battery of any ordinary and suitable kind. To the other pole or electrode of this battery C is connected a wire, $e$, of suitable size and electrical conductivity, leading to and passing through a properly-packed opening or stuffing-box on the top of the vessel or upright tube A, and extending down through the cylindrical center of the said vessel or upright tube, and through the opening heretofore mentioned in the top of the float B, and terminating at any desired place in diverging horns or points, as represented in the drawings. From the opening where the wire $e$ enters the vessel or upright tube A to about the place where it diverges into horns or points the wire $e$ is well and suitably insulated. The horns or points are uninsulated, and are so adjusted as to make a close contact or connection with the plate $d$, at the upper end of the float B, whenever this float falls low enough to touch them or rest upon them, thereby completing and closing the circuit of the electric battery C. The circuit is in like manner closed when these points touch bottom of float B. Within the circuit of this electric battery is also the continuous ringing electric alarm-bell D, of any ordinary pattern, placed in any suitable or convenient spot, and so adjusted that whenever the circuit of the electric battery C is closed or completed this bell will ring and continue to ring until the circuit is broken again or the strength of the battery is used up. As many electric alarm-bells may be placed in the same circuit at different points as desired. In the present instance I have shown but one. When the water-level in the boiler rises or falls, there is a like rising or falling of the water in the vessel or tube A, carrying up or down with it the float B. The rod or wire $e$ can be fixed at any desired point, so that when the float falls to that point it will come in contact, through the plate $d$ on the top of the float, with the horns or points at the lower end of the rod or wire $e$ and close the circuit of the battery C, thereby causing the electric alarm-bell or any number of them in this circuit to ring and continue to ring until the float is removed from the contact by raising the level of the water.

In the accompanying drawings I also show the ordinary gage-cocks, *f* and *g*, attached to the vessel or tube A, as they are sometimes attached to "water-barrels" or boiler-heads.

I am aware that prior to my invention low-water alarms operated by means of a float in a vessel or upright tube have been made. I therefore do not claim such a combination, broadly; but What I do claim as my invention, and desire to secure by Letters Patent, is—

The combination, in an electric low-water alarm, of two poles or electrodes of an electric battery with a hollow metallic float of good electrical conductivity attached to one of these poles or electrodes, and so arranged that the other pole or electrode, passing through a hole in top of float and terminating within the float, will touch at top and bottom inside the float with the fall and rise of the water in the boiler, thereby closing and opening the circuit of the electric battery, and indicating both the low and high water in boiler, substantially as and for the purpose set forth.

WILLIAM PENN RYMAN.

Witnesses:
J. H. W. HAWKINS,
BENJ. DAVEY, Jr.